United States Patent [19]

Nozoe et al.

[11] Patent Number: 4,993,508
[45] Date of Patent: Feb. 19, 1991

[54] REAR WHEEL SUPPORTING DEVICE FOR A MOTORCYCLE

[75] Inventors: Kouichi Nozoe, Saitama; Tetsuya Kudo, Tokyo, both of Japan

[73] Assignee: Honda Giken Kogyo Kabushiki Kaisha, Tokyo, Japan

[21] Appl. No.: 404,054

[22] Filed: Sep. 7, 1989

Related U.S. Application Data

[63] Continuation of Ser. No. 141,115, Jan. 5, 1988, abandoned.

[30] Foreign Application Priority Data

Jan. 27, 1987 [JP] Japan .................................. 62-17019
Jan. 27, 1987 [JP] Japan ............................. 62-10469[U]

[51] Int. Cl.$^5$ ........................ B62D 61/02; B62K 11/00
[52] U.S. Cl. ................................ 180/219; 280/304.3
[58] Field of Search ...................... 180/219, 227, 231; 280/288.4, 304.3

[56] References Cited

U.S. PATENT DOCUMENTS 3,724,582 4/1973 Wood .............................. 280/304.3
4,742,884 5/1988 Ishikawa ........................ 180/227 X

FOREIGN PATENT DOCUMENTS 2058799 3/1979 Fed. Rep. of Germany ... 280/304.3

Primary Examiner—Charles A. Marmor
Assistant Examiner—Mitchell Bompey
Attorney, Agent, or Firm—Lyon & Lyon

[57] ABSTRACT

A motorcycle rear swing arm structure includes a chain case having partition members for obstructing the course of granular particles against the surface of the brake disc on the wheel carried by the swing arm. The chain case can also be provided with baffle members effective to collect droplets of oil sprayed from the drive chain sprocket and for conducting it for discharge away from the swing arm.

12 Claims, 5 Drawing Sheets

REAR WHEEL SUPPORTING DEVICE FOR A MOTORCYCLE

This application is a continuation of Ser. No. 141,115, filed 1/5/88, now abandoned.

BACKGROUND OF THE INVENTION

This invention relates to a rear wheel supporting device for a vehicle, such as a motorcycle, having a cantilever swing arm, and, more particularly, to a rear wheel supporting device for a motorcycle having a partition structure provided between the brake disc and the sprocket arranged close to opposite sides, respectively, of the rear free end of the swing arm, so as to physically separate the brake disc and the sprocket thereby to protect the surface of the brake disc. The partition structure also contains a baffle arrangement adapted to effectively discharge lubricating oil splashed by the rotating sprocket outwardly of the vehicle body.

It is known to use a cantilever swing arm as a rear wheel supporting device for a motorcycle. Such swing arms are adapted to be pivotably mounted at one end on a rear portion of the vehicle body frame and to contain at the other end, which is its free end, a vehicle axle supporting portion on one side of which the rear wheel of the vehicle is provided. Since such a type of swing arm makes it possible to attach and detach the rear wheel at one side of the vehicle body, it is more advantageous from the vehicle maintenance standpoint and has been received favorably, particularly in the field of racing vehicles, or the like.

In the case of cantilever swing arms of the described type, since the brake disc and the sprocket are provided at opposite sides of the vehicle axle supporting portion, they are arranged relatively close to each other as compared with their being arranged on a fork like member of the prior art. For this reason, the surface of the brake disc may be damaged by fine, granular metal pieces, or other debris, developed from impacting of the chain with grains, for example, sand grains spattered by rotation of the sprocket. Accordingly, one aspect of the present invention is intended to prevent scattering of such grains thereby to protect the surface of the brake disc.

Also, in a chain-drive type motorcycle, where it is ordinary to arrange a chain case along the chain, the chain case has a sectionally inverted-U-shape so as to cover the chain. By this structure, the oil which may be splashed by the chain and sprocket is prevented from further splashing outwardly from the vehicle.

In such structures, however, oil splashed by rotation of the chain and sprocket, generally adheres to the top inside of the chain case, then is driven downwardly by the wind which occurs during driving and/or by vibration. Therefore, if the chain case is disposed above a cantilever swing arm, the surface thereof is easily and widely contaminated by receiving the fallen oil droplets. Furthermore, it is difficult to remove the spots resulting from the oil droplets within the interior region of the vehicle body. Therefore, it is another object of the present invention to provide means capable of removing such splashed oil efficiently from the motorcycle body.

SUMMARY OF THE INVENTION

The present invention provides a rear wheel supporting device for a motorcycle comprising a cantilever swing arm which is pivotably mounted at one end on a rear portion of a vehicle body and which is provided with a supporting portion for supporting the vehicle axle at the other end so as to support the rear wheel on one side of said vehicle axle supporting portion, and a brake disc and a sprocket for driving a chain separately arranged, respectively, at opposite sides of the vehicle axle supporting portion. According to one aspect of the invention, a partition structure is provided between the sprocket and the brake disc so as to physically separate them and with one end edge of the partition structure being adapted to contact intimately with the surface of the swing arm.

Where, according to this aspect of the invention, the swing arm is provided with a partition structure, one side of which intimately contacts the surface of the swing arm the partition structure serves to physically separate the brake disc and the sprocket. Consequently, if the sprocket rotates so as to spatter grains of sand or metal pieces, or the like, in the direction of the brake disc, the grains are obstructed by the partition structure and do not reach the brake disc.

According to another aspect of the invention a baffle arrangement disposed in the chain case that defines the partition structure extends obliquely with respect to the moving direction of the motorcycle so that the rear end portion thereof is directed toward the outer region of the motorcycle body. The baffle arrangement is so disposed as to extend downwardly from inside the top portion of the chain case, at least in the vicinity of the sprocket. Therefore, as a result of this baffle arrangement, oil splashed upwardly from the sprocket and chain adheres to the top portion of the chain case. The oil is then carried away to the rear wall portion obliquely and backwardly. When the so-driven oil reaches the rear edge of the baffles it falls outwardly of the motorcycle body. It, therefore, does not contaminate the swing arm even if the chain case is disposed above the swing arm.

For a better understanding of the invention, its operating advantages and the specific objectives obtained by its use, reference should be made to the accompanying drawings and description which relate to a preferred embodiment thereof.

DETAILED DESCRIPTION OF THE PREFERRED EMBODIMENT

Figure 1:
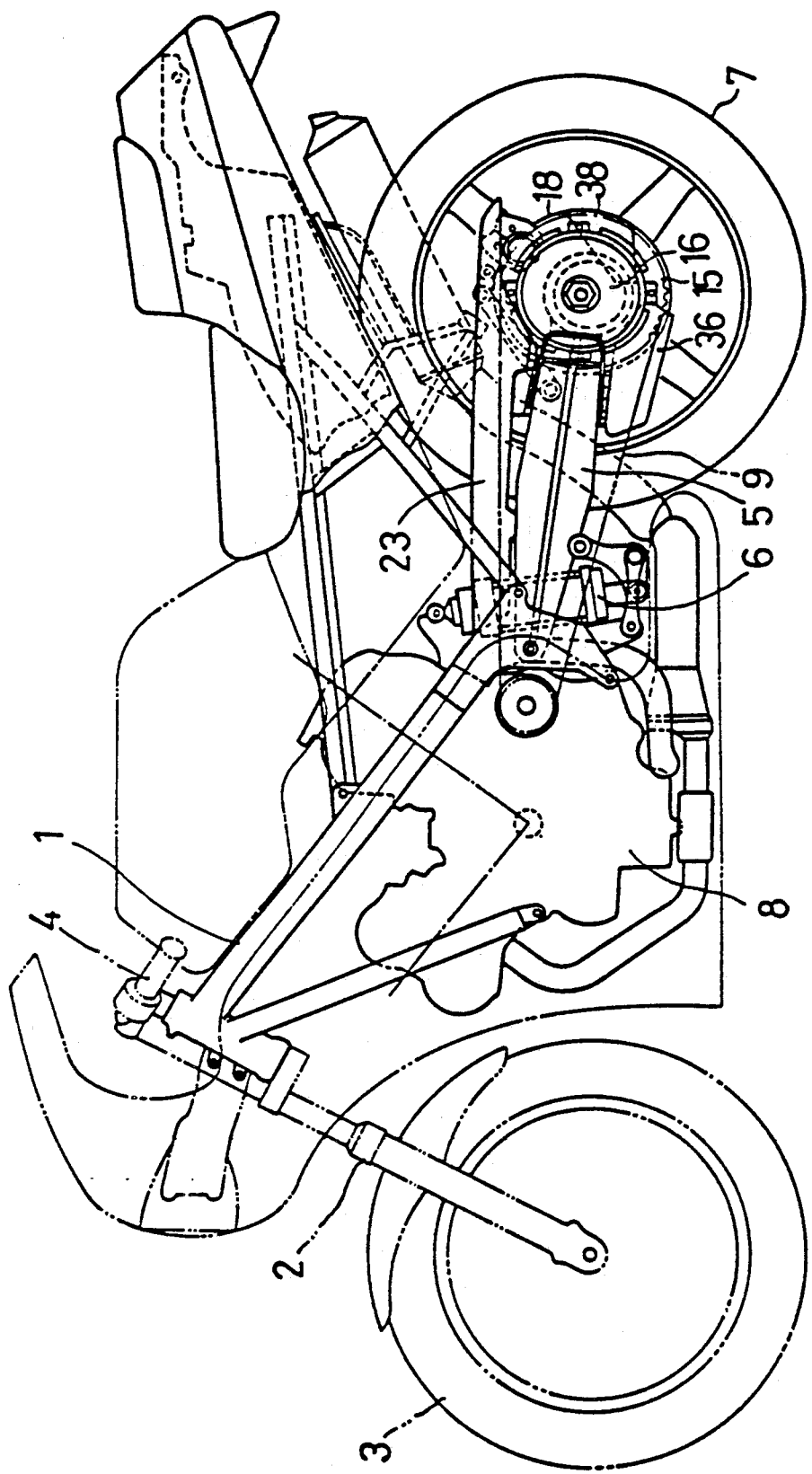
FIG. 1 is a side elevational view illustrating the internal structure of a motorcycle equipped to practice the present invention.

As shown in FIG. 1, in the illustrated motorcycle, a front fork 2 is pivotably supported on a front portion of a main frame 1 which constitutes a main portion of a vehicle body frame. A front wheel 3 is supported by the front fork 2. The front wheel 3 is steered by a handle 4 positioned on the upper portion of the front fork 2. Further, on the rear end portion of the main frame 1 is pivotably mounted the front end of a cantilever swing arm 5. The swinging movement of this swing arm 5 is cushioned by a rear cushion unit. A rear wheel 7 is mounted on one side of the rearward portion of the swing arm 5. The rear wheel 7 is driven through the intermediary of a chain 9 by an engine 8 mounted on the main frame 1.

Figure 2:
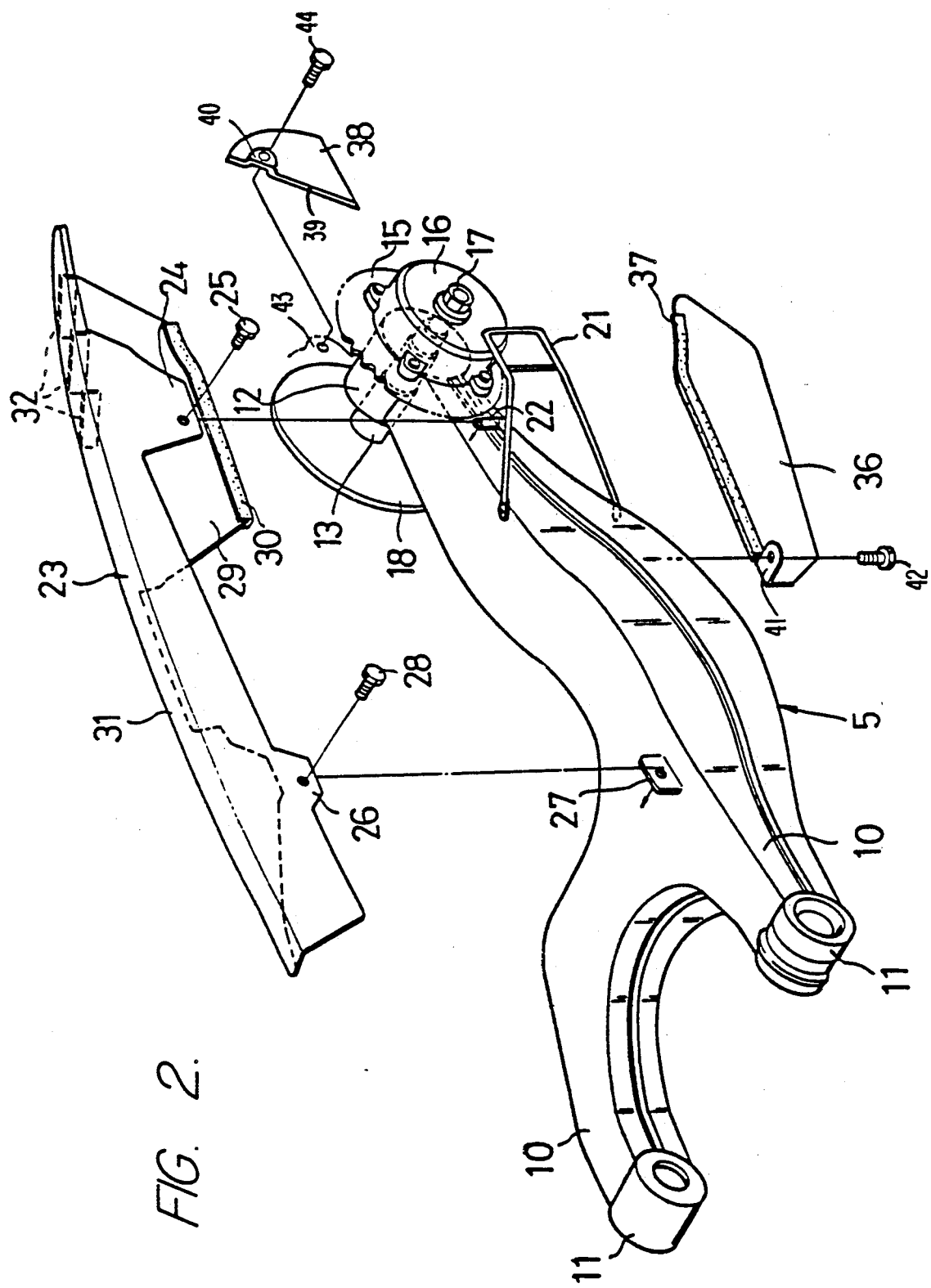
FIG. 2 is an exploded view of the swing arm and chain case structure of the motorcycle of FIG. 1.
Figure 3:
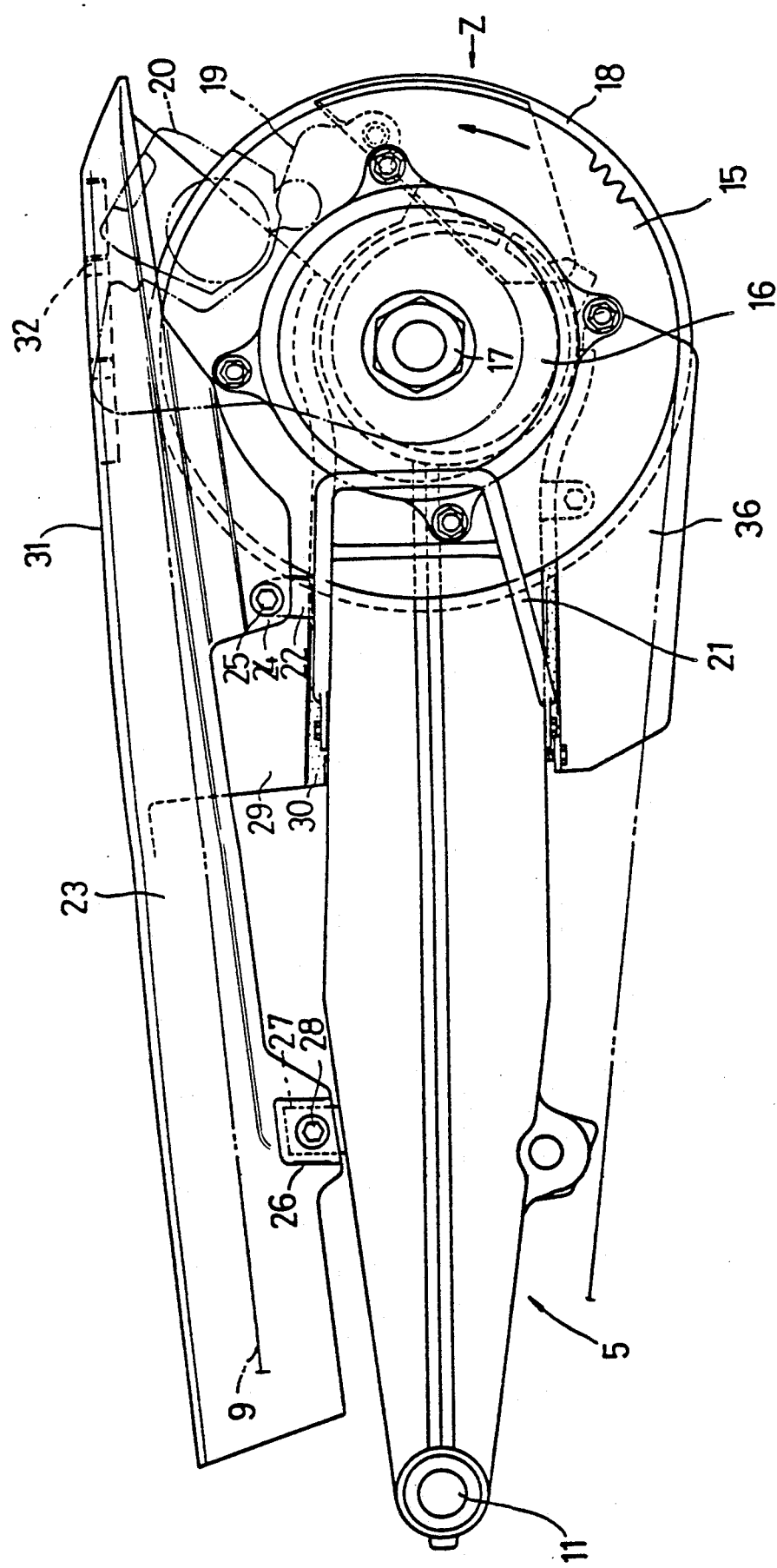
FIG. 3 is a side elevational view of the assembled swing arm and chain case of FIG. 2.

As shown in FIGS. 2 and 3, the swing arm 5 is substantially Y-shaped as viewed from above and includes mounting arm portions 10 branched in a fork-like shape at its front end. On the leading end of the mounting arm portion 10 is provided a pivot portion 11 which is pivotably mounted on the rear portion of the aforesaid main frame 1. Consequently, the rear end portion of the swing arm 5 defines a free end on which the vehicle axle supporting portion 12 is formed. The vehicle axle supporting portion 12 rotatably mounts a vehicle axle 13 which is capable of freely entering from one side of the vehicle body supporting portion 12. On a large diameter end of the vehicle axle 13 is formed a flange 14 on which the rear wheel 7 is mounted (see FIG. 4). The other end of the vehicle axle 13 projects to the other side through the vehicle axle supporting portion 12. On the projecting portion of the axle 13 are a sprocket 15 for driving the chain as well as a damper 16 of known construction. The projected end of the vehicle axle is fastened by an axle nut 17. Accordingly, the vehicle axle is mounted to the swing arm by the one axle nut 17 disposed at one side of the swing arm 5. Also, on the flange 14 is integrally rotatably mounted a brake disc 18. On the vehicle axle supporting portion 12 adjacent the brake disc 18 is provided a caliper bracket 19 indicated by phantom lines in FIG. 4. A caliper 20 supported on the caliper bracket 19 is capable of slidingly contacting the brake disc 18.

Extending laterally from one side of the swing arm in the vicinity of the sprocket 15 is a substantially C-shaped sprocket guard 21 adapted to cover part of the sprocket 15. The sprocket guard 21 is mounted at both of its ends on upper and lower surfaces, respectively, of the swing arm 5. On the upper side of the sprocket guard 21 is provided a stay 22 which extends inwardly and which has a member that is offset upwardly. On the leading end of the stay 22 is mounted, by means of a bolt 25, the rear mounting portion 24 of a chain case 23. Providing such a stay 22 is advantageous for production considerations as compared with a long integrally formed stay extending from the swing arm 5 for supporting the chain case 23.

Figure 4:
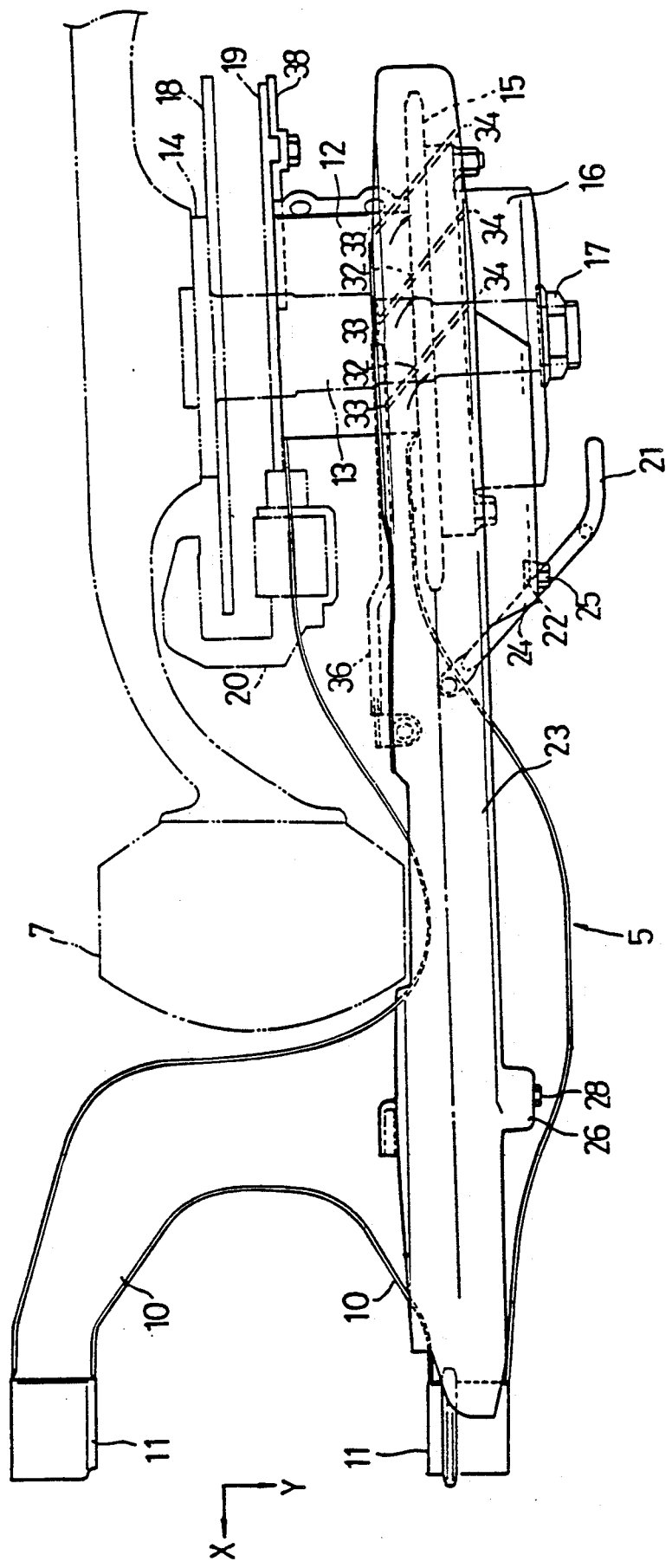
FIG. 4 is a plan view of the assembled swing arm and chain case of FIG. 2.

As shown in FIGS. 3 and 4, the chain case 23 extends longitudinally of the swing arm 5 so as to cover the chain 9 meshing with the sprocket 15. A front mounting portion 26 of the chain case 23 is secured to a bracket 27 formed to project from the upper surface of the swing arm 5.

Also, the chain case 23 contains a side wall portion 29 disposed adjacent the side of the brake disc 18 and arranged to extend close to the upper surface of the swing arm 5. Further, within the range of the side wall portion 29, between the sprocket 15 and the brake disc 18, is attached a seal 30 that consists of a resilient member, U-shaped in section, for cushioning contact of the lower edge of the wall portion 29 against the upper surface of the swing arm 5. Therefore, the wall portion 29 of the chain case 23 forms a partition which physically separates the region containing the sprocket 15 from that containing the brake disc 18.

Also, on the lower surface of the swing arm 5 is provided a plate-like lower partition 36 arranged to extend downwardly within the region between the brake disc 18 and the sprocket 15. On one end portion of the lower partition 36 is provided a mounting portion 41 extending in a horizontal direction therefrom. The lower partition 36 is directly attached to the lower surface of the swing arm 5 at the mounting portion 41 by means of a bolt 42. A seal 37, similar to the seal 30, is provided between the upper edge of the lower partition 36 and the lower surface of the swing arm 5. The seal 37 is designed to extend substantially fully along the space between the sprocket 15 and the brake disc 18.

Further, a rear partition 38 is provided in a rear portion of the vehicle axle supporting portion 12. Because the rear partition 38 is attached to abut with a linear side portion of the caliper bracket 19, the abutting side 39 is linear and a mounting step portion 40 is formed at an upper portion of the abutting side 39. A projecting portion 43 from the caliper bracket 19 is fitted into the mounting step portion 40 and fastened therein by means of a bolt 44.

As shown in the drawing figures, a plurality of ribs 32 are provided to extend downwardly from the interior surface of the top portion 31 of the case 23 at a position near the sprocket 15. As shown in FIG. 4, the ribs 32 are laterally obliquely arranged with respect to the vehicle's advance direction (i.e., the direction indicated by arrow X). The front end portions 33 of the ribs 32 are directed to the center side of the vehicle body and the rear end portion 34 thereof are directed toward an outer region (i.e, in the direction indicated by arrow Y) of the vehicle body.

Figure 5:
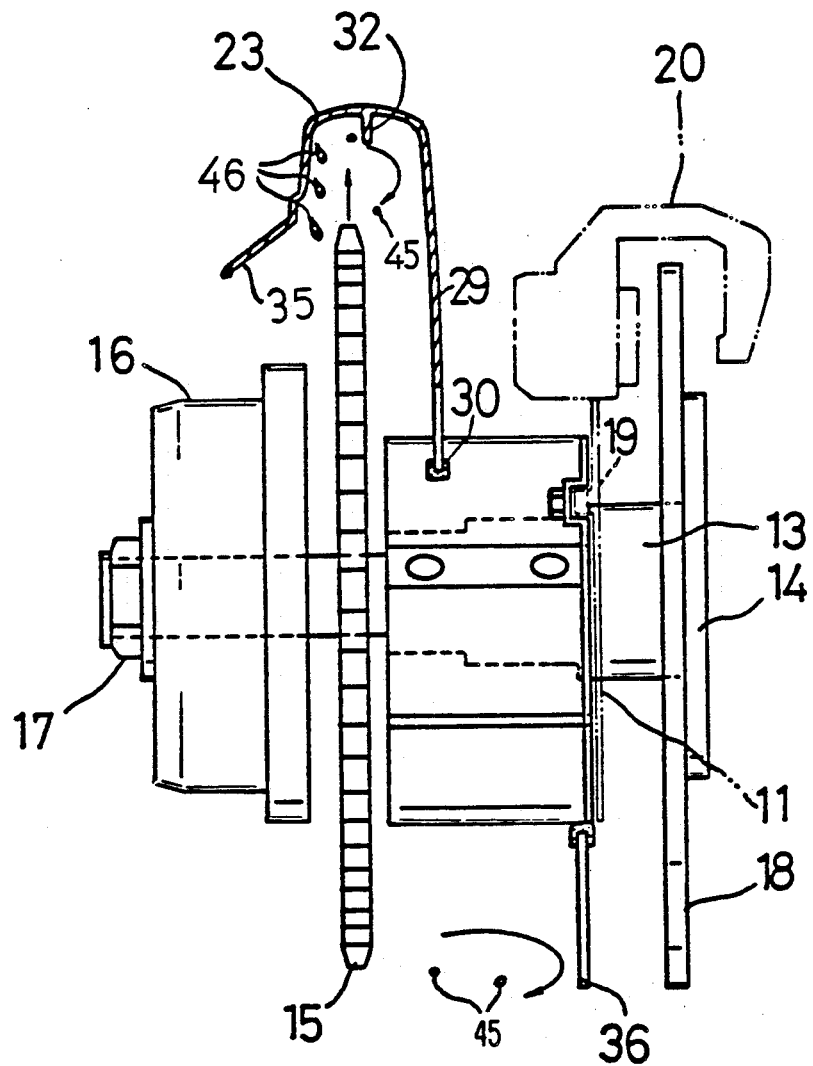
FIG. 5 is a rear elevational view, partly in section, of the swing arm and chain case of FIG. 2.

The herein described apparatus is arranged to operate as follows. With reference to FIG. 5, when the sprocket 15 rotates, the grains 45 which consist of granular metal pieces resulting from contact of the chain with the sprocket 15, or sand grains, or the like, are spattered randomly from the chain. A portion of the spattered grains is directed in the direction of the brake disc 18; however, since a partition is formed by means of the wall portion 29 and the lower diaphragm 36, as well as the rear diaphragm 38, to physically separate the space between the sprocket 15 and the brake disc 18 about substantially the entire circumference of the vehicle axle supporting portion 12, substantially the entire surface of the brake disc 18 is protected by the so-formed partition (see FIG. 2). Accordingly, the grains 45 cannot reach the brake disc 18 through the partition because they collide against the surfaces of the wall portion 29, the lower diaphragm 36 and the rear diaphragm 38, and are repelled from these surfaces to fall downwardly from the vehicle. Therefore, the surface of the brake disc 18 is not damaged due to the grains 45.

Moreover, since the wall portion 29 and the lower partition 36 contact intimately with the surface of the swing arm 5 through the intermediary of the seals 30 and 37, respectively, it is possible to positively partition the space between the sprocket and the brake disc 18. Also, the seals 30 and 37, being resilient, ensures that partitioning of the adjacent spaces is maintained even if the swing arm 5 is caused to vibrate greatly. Accordingly, the disclosed arrangement makes it possible to maintain the integrity of the surface of the brake disc 18.

Also, when sprocket 15 rotates in a direction indicated by the arrow in FIG. 3, oil which is spattered by the rotation of the sprocket 15 and which adheres to the inner surface of the top portion 31 of the case 23, is conducted up to the ribs 32 by means of the running wind of the vehicle as shown by the arrows in FIG. 4.

The oil thus flows obliquely rearwardly along the ribs 32 to the rear end portions 34 thereof from whence it is discharged downwardly. Consequently, the oil discharge occurs at the outermost side of the vehicle body from the center of the vehicle body. Therefore, most of the discharged oil falls outwardly of the vehicle body so as not to contaminate the upper portion of the swing arm 5. Even if a quantity of oil should fall on the swing arm, it falls on the outer side of the vehicle body, which is readily accessible. Therefore, since the oil does not normally fall on the center of the vehicle body, which is unaccessible, it is easy to remove it from the vehicle surface.

Additionally, the stream of oil repelled by the sprocket 15 is adapted not to widen toward the front portion of the chain case interior by the presence of the ribs 32.

Moreover, in the described arrangement, since the partition structure is formed by effectively utilizing the chain case, which is necessarily used for a chain driving vehicle, the need to obtain this added function from an additional piece of equipment is obviated. Further, although, in the described arrangement, substantially the entire surface of the brake disc 18 is covered, it should be appreciated that in some instances it may not be necessary to cover the entire brake disc surface with the described plural partitions, as in the aforesaid embodiment, and the surface may need be only, partially covered by less than all of them.

It should be further understood that, although a preferred embodiment of the invention has been illustrated and described herein, changes and modifications can be made in the described arrangement without departing from the scope of the appended claims.

We claim:

1. A rear wheel supporting device for a motorcycle having a body, comprising:
   a swing arm having one end connected for pivotal movement to said motorcycle body and an axle-supporting portion at the other end thereof;
   an axle positioned in said axle-supporting portion;
   a rear wheel mounted on said axle on one side of said axle-supporting portion;
   a sprocket for driving said wheel mounted on the other side of said axle-supporting portion; and
   partition means positioned between said rear wheel and said sprocket, said partition means being carried by said swing arm and having edge means disposed in substantially contiguous relation therewith to positively laterally separate said sprocket from said rear wheel.

2. The apparatus according to claim 1 in which said motorcycle includes a chain-driving power unit having a chain operatively connecting said sprocket and a brake disc operatively disposed in said rear wheel; and wherein said partition means comprises a chain case superposed upon said power unit chain, said chain case including a wall portion laterally interposed between said sprocket and said brake disc for positively separating said sprocket and said brake disc.

3. A rear wheel supporting device for a motorcycle having a body, comprising:
   a swing arm having one end connected for pivotal movement to said motorcycle body and an axle-supporting portion at the other end thereof;
   an axle positioned in said axle-supporting portion;
   a rear wheel mounted on said axle on one side of said axle-supporting portion;
   a sprocket for driving said wheel mounted on the other side of said axle-supporting portion;
   partition means carried by said swing arm positioned between said rear wheel and said sprocket, said partition means including edge means disposed in substantially contiguous relation to said swing arm; and
   a resilient seal interposed between said edge means and the facing surface of said swing arm.

4. A rear wheel supporting device for a motorcycle having a body, comprising:
   a swing arm having one end connected for pivotal movement to said motorcycle body and an axle-supporting portion at the other end thereof;
   an axle positioned in said axle-supporting portion;
   a rear wheel mounted on said axle on one side of said axle-supporting portion;
   a brake disc supported by said axle adjacent said rear wheel;
   a sprocket for driving said wheel mounted on the other side of said axle-supporting portion; and
   a chain-driving power unit having a chain operatively connecting said sprocket, partition means including a chain case superposed upon said chain positioned between said sprocket, said chain case being carried by said swing arm and having a lower edge substantially contiguous with said swing arm to positively laterally separate said sprocket from said brake disc.

5. The apparatus according to claim 4 in which said chain case wall portion extends to the upper surface of said swing arm; and a lower partition connected to the lower surface of said swing arm between said sprocket and said brake disc.

6. A rear wheel supporting device for a motorcycle having a body, a chain-driving power unit and a brake disc operatively disposed in relation to said rear wheel, comprising:
   a swing arm having one end connected for pivotal movement to said motorcycle body and an axle-supporting portion at the other end thereof;
   an axle positioned in said axle supporting portion;
   a rear wheel mounted on said axle on one side of said axle-supporting portion;
   a sprocket for driving said wheel mounted on said axle on the other side of said axle-supporting portion;
   a chain operatively connecting said power unit and said sprocket;
   partition means carried by said swing arm positioned between said rear wheel and said sprocket forming a physical separation therebetween, said partition means including a chain case covering said chain and said sprocket and having a wall portion substantially contiguous with said swing arm; laterally interposed between said sprocket and said rear wheel, and baffle means depending from the interior surface of said enclosure for accumulating oil splattered from said sprocket, said baffle means being disposed on said enclosure and extending in the interior thereof in a direction for directing at least some of said accumulated oil away from said motorcycle body.

7. A rear wheel supporting device for a motorcycle having a body, a chain-driving power unit and a brake disc operatively disposed in said rear wheel, comprising:

a swing arm having one end connected for pivotal movement to said motorcycle body and an axle-supporting portion at the other end thereof;

an axle positioned in said axle-supporting portion;

a rear wheel mounted on said axle on one side of said axle-supporting portion;

a sprocket for driving said wheel mounted on the other side of said axle-supporting portion; and partition means carried by said swing arm positioned between said rear wheel and said sprocket forming a physical separation therebetween, said partition means including a chain case superposed upon said power unit chain and having a substantially inverted U-shaped enclosure over said sprocket and a wall portion laterally interposed between said sprocket and said brake disc and baffle means including a plurality of longitudinally spaced ribs within said enclosure for accumulating oil splattered from said sprocket.

8. The apparatus according to claim 7 in which said ribs are disposed in laterally oblique relation with respect to the direction of rotation of said sprocket.

9. The apparatus according to claim 8 in which the rearwardmost ends of said ribs are disposed outwardly of said vehicle body.

10. A rear wheel supporting device for a motorcycle having a body, comprising:

a swing arm having one end connected for pivotal movement to said motorcycle body and an axle-supporting portion at the other end thereof;

an axle positioned in said axle-supporting portion;

a rear wheel mounted on said axle on one side of said axle-supporting portion;

a chain-driving sprocket for driving said wheel mounted on the other side of said axle-supporting portion;

a chain case covering said sprocket, said chain case being a substantially inverted U-shaped enclosure over said sprocket; and including a plurality of longitudinally spaced ribs within said enclosure; and baffle means for accumulating oil splattered from said sprocket.

11. The apparatus according to claim 10 in which said ribs are disposed in laterally oblique relation with respect to the direction of rotation of said sprocket.

12. The apparatus according to claim 11 in which the rearwardmost ends of said ribs are disposed outwardly of said vehicle body.

* * * * *